Figure 1:
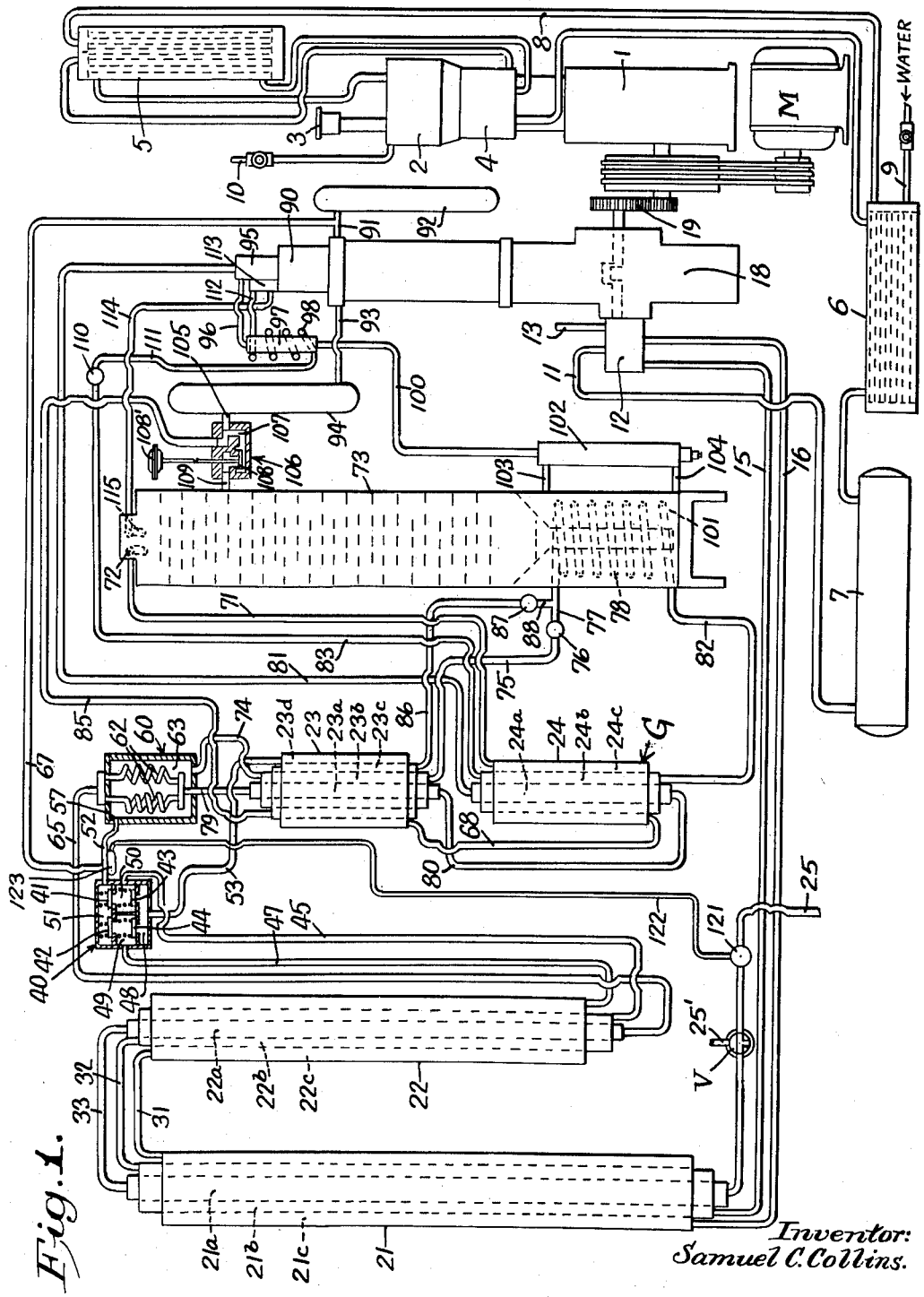

Inventor:
Samuel C. Collins.
by Louis A. Maxson.
Attorney.

United States Patent Office 2,732,692
Patented Jan. 31, 1956

2,732,692
METHODS OF AND MEANS FOR TREATING GASES

Samuel C. Collins, Watertown, Mass., assignor to Joy Manufacturing Company, Pittsburgh, Pa., a corporation of Pennsylvania Continuation of application Serial No. 161,786, May 13, 1950. This application March 24, 1955, Serial No. 496,433

17 Claims. (Cl. 62—123)

This invention relates to improvements in methods of and means for treating gases. It is an improvement over the subject matter of the Samuel C. Collins Patent No. 2,685,183 which was granted upon a division of my original application filed October 18, 1949, Serial No. 122,077, and this present application is a continuation of my application Serial No. 161,786, filed May 13, 1950, for Methods of and Means for Treating Gases.

Apparatus for the production of oxygen from atmospheric air may be employed, if suitably constructed, for the delivery of nearly pure oxygen at pressures suitable for shop lines and at pressures adapted for cylinder charging. Pressures on the order of 50 to 60 p. s. i. and on the order of 1500 p. s. i. to 2000 p. s. i. are respectively suitable for the purposes mentioned. By effecting the delivery from the column of liquid oxygen and building up the pressure of the liquid oxygen to the necessary degree substantial savings in power, and reduction in the size of the oxygen pumping equipment, can be effected as compared with arrangements in which gaseous oxygen has its pressure increased. However, there would be a waste of refrigeration if the heat of vaporization of the liquid oxygen could not in some manner be recovered. To this subject further attention will shortly be given.

The production of oxygen from atmospheric air is commonly effected by processes involving expansion, liquefaction and fractionation. In preferred forms of such procedures reversing countercurrent heat exchangers are employed. These include courses traversed in alternation by entering raw air and each serving, when not employed for the inflow of air, as a conducting means for an effluent product of rectification, in the case of oxygen production the effluent being relatively, though not completely, pure nitrogen. These exchangers commonly also include a third course through which the desired product of the rectification process may be passed, for the purpose of conserving refrigeration and effecting the more thorough elimination from the entering air stream of moisture and carbon dioxide. The periods of flow of the entering air stream and leaving nitrogen effluent through a given course may be on the order of a few minutes, perhaps three or four minutes, for example.

During the periods in which the raw air is passing through a given course, water and carbon dioxide are precipitated, and accumulate in liquid or solid phase on the metal surfaces of the passageway through which the air is flowing into the apparatus. These deposits must be removed, upon a reversal of the flows through the reversing heat exchanger courses, by the nitrogen effluent.

The water vapor will be removed from the entering air stream in the reversing heat exchanger course which such air traverses, in the portions first traversed by such stream. The carbon dioxide will be deposited out further along in the course, and unless the course is adequately cooled, complete separation of the carbon dioxide will not be effected. When the leaving oxygen product enters the reversing heat exchanger or exchangers in a completely liquid state, the water vapor and carbon dioxide will be fully removed in these exchangers, and, moreover, the leaving nitrogen efflux will be able fully to remove the impurities deposited on the walls of the exchanger courses in the periods during which these are being traversed by entering air.

Reverting to the matter of conservation of refrigeration, it will be appreciated that if there be provided an evaporator-condenser between the reversing heat exchanger or exchangers and the column, and a mass of air per unit of time appropriate to the complete vaporization of the liquid oxygen at the pressure at which it enters this evaporator-condenser be passed through the latter in counterflow relation to the leaving oxygen, then this portion of entering air may be liquefied in the evaporator-condenser by the heat of vaporization of the leaving liquid oxygen. For example, compressed air at about 160 p. s. i. may be supplied to a suitable evaporator-condenser and be condensed when the temperature is reduced to say, 112° K., and the heat removed to effect the condensation may be absorbed by heat transfer within the evaporator-condenser by an outwardly flowing stream of initially liquid oxygen, and the oxygen may be vaporized at 107° K. and 50 p. s. i. by the heat absorbed from the compressed air as the latter is liquefied. Such an arrangement will involve a minimum loss of refrigeration and concurrently avoid the need for a larger sized oxygen pump, and there will be a conservation of power because the work of raising the pressure of the liquid oxygen through a pressure range of some 40 to 50 p. s. i., for example, will be much less than is required similarly to increase the pressure of an equal mass of gaseous oxygen. By a procedure such as has last been described, on the order of 12 percent of the entering air may be condensed.

Passage of the leaving oxygen stream in gaseous form, plus the leaving nitrogen efflux through the reversing heat exchangers, may, however, not suffice to effect the depositing out of the carbon dioxide far enough from the end of the reversing heat exchangers nearer, in terms of flow direction, the column, for the leaving nitrogen efflux to be able completely to clear out the deposits of carbon dioxide snow in the reversing heat exchangers. Accordingly, special arrangements may be necessary during periods of delivery of low pressure gaseous oxygen. If a portion of the leaving oxygen stream is caused to enter the reversing exchangers in liquid form, the portion being kept as small as is practicable consistent with the effective operation of the reversing heat exchangers, these heat exchangers may be caused to separate out the carbon dioxide completely, and far enough from the end thereof last traversed by the entering air stream, to permit satisfactory long maintained operation. If, with an evaporator condenser properly designed for the complete use of the heat of vaporization of the oxygen to effect the liquefaction of compressed air at a given pressure of the oxygen, arrangements be made to have the pressure of the leaving oxygen increased somewhat while the pressure of the entering air remains unchanged, complete vaporization of the oxygen in the evaporator-condenser will be impossible, and accordingly a portion of the oxygen will pass into the reversing heat exchanger still in liquid form, and its heat of vaporization may be used to effect the depositing out of the carbon dioxide further back towards the point of introduction of entering air to the reversing heat exchanger, thus enabling the leaving nitrogen efflux completely to clear out the deposits from the reversing heat exchanger courses as it passes through them. Again, if, with a given mass of air per minute entering the system, the portion taken by an expansion engine be increased so that the quantity of air passing through the evaporator-condenser mentioned is inadequate fully to vaporize the leaving oxygen even though the relative pressures and temperatures might be such as to permit complete vaporization of the leaving oxygen if the quantity of air brought into heat exchange relationship to it were sufficient, there will be provided a quantity of unvaporized (still liquid) oxygen entering the reversing heat exchanger, with a resultant additional cooling of the latter by the leaving oxygen stream to a sufficient degree to enable the complete separation out and removal of the carbon dioxide within the reversing heat exchangers.

As will later be apparent, the incomplete liquefaction of the relatively small fraction of the entering air which passes through the evaporator-condenser mentioned will not be material as the liquefaction may be completed either in a further heat exchanger or in a boiler-condenser in the column. In both procedures mentioned, it will be understood that there will be employed an evaporator-condenser which will conserve refrigeration through the use of a portion of the heat of vaporization of the leaving oxygen in the liquefaction of a portion of the entering air stream, and there will be simultaneously a utilization of a portion of the heat of vaporization of the leaving oxygen within the reversing heat exchanger to render unnecessary the recirculation through the latter, during relatively low pressure oxygen production, of a portion of the entering air stream, or a double circulation through the reversing exchanger of a portion of the leaving nitrogen efflux.

One of the objects of this invention is to provide an improved method of oxygen generation in which reversing heat exchanger means is employed for the purification of entering air, and in which the maximum conservation of refrigeration is effected through the employment of as great an amount of the heat of condensation of the leaving oxygen product as is consistent with the need for the utilization of a portion of such heat in the reversing heat exchangers. Another object of the invention is to provide an improved oxygen generator of the reversing heat exchanger type having improved means incorporated therein for enabling the maintenance of long continued periods of efficient operation at relatively low pressure oxygen delivery pressure and with conservation of refrigeration and sustained high purity of the product. Like objects, but with other gases to be separated and products of rectification, are also incident to the invention in its broader aspects. An other objects will hereinafter more fully appear.

Figure 2:
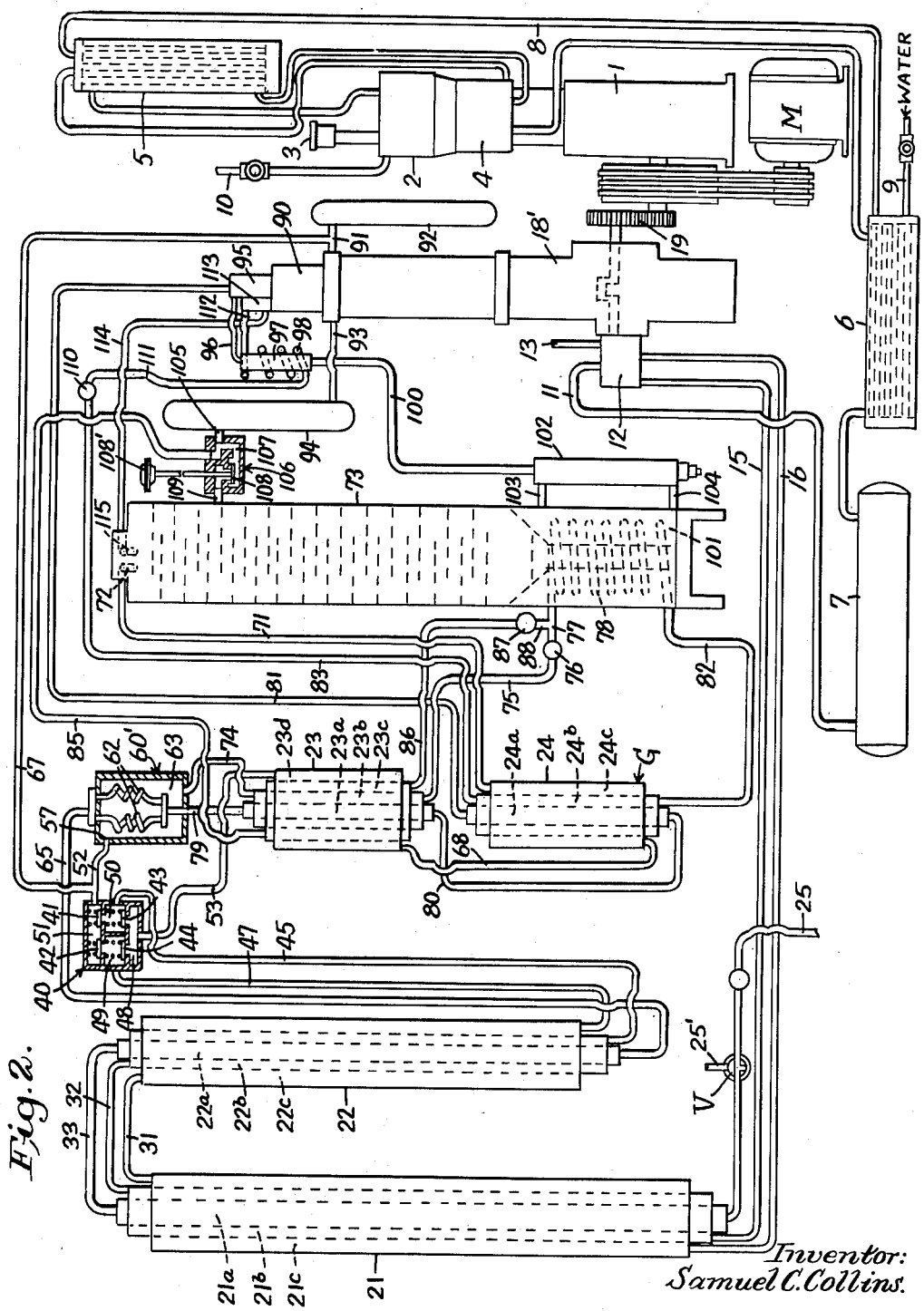

In the accompanying drawings, in which two physical embodiments of the invention are disclosed for purposes of illustration, Fig. 1 is a diagrammatic view of a first embodiment and
Fig. 2 is a diagrammatic view of a second embodiment.

Referring now to Fig. 1 of the drawings, it will be noted that an apparatus very similar in many particulars to the one of my application above mentioned, is shown. A motor M drives a compressor, shown as a two-stage compressor 1, whose low pressure cylinder 2 takes air through an intake connection 3 and delivers it to a high pressure cylinder 4. The structure of the compressor need not be gone into in detail, but it may be noted that the air from the low pressure cylinder 2 passes through an inter-cooler 5 on its way to the high pressure cylinder 4, and that the air discharged from the high pressure cylinder 4 is delivered to an after-cooler 6, from which it passes to a receiver 7. The cooling water circuit for the after-cooler 6, the inter-cooler 5, the high pressure compressor cylinder 4, and the low pressure compressor cylinder 2, is shown at 8, with water supply connection designated 9 and discharge at 10.

The compressor delivers air at a temperature of approximately 300° K. and at a pressure of 160 p. s. i. (all pressures are gauge unless otherwise indicated) through a conduit 11 to a valve mechanism generally designated 12, on its way to an oxygen generator generally designated G; and the effluent, mainly nitrogen, leaving the generator may be discharged to the atmosphere through a conduit 13. The valve mechanism 12 is of the mechanically actuated type, and is periodically moved by power, and desirably with a snap action, to reverse the connections of the conduits 11 and 13 with a pair of conduits 15 and 16 which lead from the valve mechanism 12. In the Samuel C. Collins application, Serial No. 661,253, filed April 11, 1946, there is diagrammatically shown a reversing valve mechanism suitable for the performance of the functions of the valve mechanism 12; and an example of other mechanisms suitable for this purpose forms the subject matter of the patent to Win W. Paget No. 2,638,923, granted May 19, 1953, upon an application Serial No. 35,092, filed June 25, 1948. The power for shifting the valve mechanism 12, to effect connection of the air supply conduit 11 now with the conduit 15 and again with the conduit 16 and connection of the conduit 13 with the conduits 16 and 15 while the conduit 11 is connected with the conduits 15 and 16, may be taken from any suitable source, but is desirably taken from the drive shaft of an expansion engine 18 through any suitable reducing gearing such as that which is diagrammatically illustrated in said Collins application, Serial No. 661,253. It may here be noted that the expansion engine 18 is suitably connected through gearing or other appropriate transmission mechanism 19 with the compressor 1, so that the power developed by the expansion engine may be delivered to the driving system of the compressor 1. Reversals are adapted to be effected by the valve mechanism 12 at relatively short intervals; and suitable intervals may be on the order of three or four minutes.

Heat exchangers 21 and 22, desirably vertically disposed, and shown formed as separate units, instead of as one longer unit, in order to keep height within desirable limits, are arranged in series; and the entering air passes through the heat exchangers 21 and 22 in the order mentioned, while the leaving nitrogen passes through these same heat exchanges in the order 22, 21. Heat exchanger 21 has three courses, indicated as coaxial courses 21a, 21b, and 21c, the first the innermost course and the latter the outermost course; and exchanger 22 has similarly related courses 22a, 22b, and 22c. Through two of the courses in series in the exchangers 21 and 22, to wit, courses 21b, 22b and courses 21c, 22c the entering air and the leaving nitrogen flow alternately, the entering air flowing inwardly through one or the other of these pairs of courses and the nitrogen flowing outwardly through the one of such pairs of courses which is not at any given moment serving for the inflow of the air. Through the third course 22a of the exchanger 22 and through the corresponding course 21a of the exchanger 21, and in the order named the leaving oxygen product is discharged. The courses in the heat exchangers have been referred to as coaxial but it will be appreciated of course that the precise form of construction of the exchangers is not illustrated in the diagram, and suitable multiple-pass exchangers may assume various forms; and, in the Samuel C. Collins application Serial No. 661,253, a suitable form of exchanger is illustrated, and other possible types are illustrated in Samuel S. Collins Patents No. 2,596,008, granted May 6, 1952, and No. 2,611,586, granted September 23, 1952. Exchanger 23, shortly to be described, will be observed to be of the four-course type and exchanger 24, also shortly to be described, of the three-course type.

Conduit 15 communicates with course 21b and conduit 16 with course 21c of exchanger 21. The leaving oxygen product passes outwardly through course 21a of exchanger 21 and may pass to a shop line or to any other desired point or apparatus, through a conduit 25. If high pressure oxygen is produced it may be delivered through a conduit 25' by proper turning of a three-way valve V. If low pressure oxygen be desired, it will be desirable to control the pressure in the line 25, and this may be done by a manually adjustable valve, or by an automatically governed valve, and the latter type of control is illustrated in Fig. 1 and will be in due course described.

Course 21c of exchanger 21 is connected by a conduit 31 with course 22c of exchanger 22. Course 21b of exchanger 21 is connected by a conduit 32 with course 22b of exchanger 22. A conduit 33 connects course 21a of exchanger 21 with course 22a of exchanger 22. These courses are traversed serially in the order 22a, 21a by the leaving oxygen product as later described. It will be understood that air will flow alternately in through course 21c, conduit 31 and course 22c, or course 21b, conduit 32 and course 22b, while concurrently nitrogen will flow outwardly through the ones of said courses and passages last mentioned not carrying the entering air.

A suitable automatic reversing valve mechanism generally designated 40 is provided at the end of heat exchanger 22 last left by the entering air and first entered by the leaving nitrogen, this including four automatic check valves 41, 42, 43 and 44. This general arrangement is disclosed in the Samuel C. Collins application, Serial No. 661,253 and in the first above mentioned Collins application. The lower end of course 22b has connected with it a conduit 45, and the lower end of the course 22c has a conduit 47 connected with it. The supply sides of the check valves 43 and 44 are connected together by a chamber 48. The space between the check valves 42 and 44 is designated 49 and is separated from the chamber or space 50 between the check valves 41 and 43. The discharge sides of the check valves 41 and 42 are connected by a chamber 51. A conduit 52 leads off to a point, later described, from the chamber 51, and a conduit 53 communicates with the chamber 48. When entering air is discharged through the conduit 47 into the chamber 49, it unseats the check valve 42 and passes through the chamber 51 to the conduit 52. Concurrently, the chamber 48, to which nitrogen is continuously supplied, as later explained, through the conduit 53, is connected by opening of the check valve 43 with the chamber 50, and from the latter the conduit 45 leads the outwardly flowing nitrogen to the course 22b of the exchanger 22. On the other hand, when the entering air passes through the course 45, it maintains the check valve 43 closed and opens the check valve 41, and is discharged to the chamber 51, and from the latter to the conduit 52, while concurrently nitrogen from the chamber 48 will pass the check valve 44, and, through the chamber 49, will flow to the conduit 47 and to course 22c. It will be noted that the conduit 53 communicates with the outermost course 23d of the exchanger 23. The conduit 52 opens at 57 into the top of an evaporator-condenser 60, which is traversed, as shown for purposes of illustration, by extended conduits 62 representing a course for the conducting of oxygen; and the conduits 62 pass through a chamber 63, as this device is diagrammatically illustrated. It will be appreciated that the chamber 63 is a mere diagrammatic illustration of any suitably formed course adapted for traverse by entering air in heat exchange contact, through the walls of the course 62, with oxygen traversing the course 62.

The mode of operation of the check valve devices may be readily understood if it is observed that there is a large pressure difference between the entering air and the leaving nitrogen and accordingly that the nitrogen cannot unseat any check valve whose top is subjected to the pressure of the entering air.

A conduit 65 connects the oxygen conducting courses 62 of the evaporator-condenser 60 with the central course 22a of the exchanger 22. A conduit 67 connects the conduit 52 with the inlet of the expansion engine 18, as later described.

Reverting to the heat exchanger 23, it will be observed that this has four courses; a central one, 23a; a next course, 23b; a third course, 23c; and an outer course, 23d, earlier mentioned and surrounding, as shown on the drawings, course 23c. Obviously the arrangement of the courses and the structure of this exchanger are subject to wide structural variations.

Exchanger 24 is shown as having a central course 24a, an outer course 24c and an intermediate course 24b. It, too, is subject to wide structural variation. It will be understood that the several courses of the exchanger 23 and those of the exchanger 24, will be in good heat exchange relation with respect to each other.

It has been noted that the conduit 53 is connected with the outermost course 23d of exchanger 23. This connection is with the top of such course. The bottom of course 23d is connected by a conduit 68 with the bottom of course 24c of exchanger 24, and the top of course 24c is connected by a conduit 71 with a nitrogen outlet (efflux connection) 72 of a single column 73. The compressed air course 63 of the evaporator-condenser 60 is connected by a conduit 74 with the top of course 23b of exchanger 23. The bottom of said course is connected by a conduit 75 with a valve device 76, which in the particular apparatus shown and when the latter is used for oxygen production, is adjusted to effect a pressure drop between its opposite sides of on the order of 90 p. s. i. for an air supply pressure, heretofore mentioned, of 160 p. s. i. This is substantially the same reduction in pressure as occurs in the expansion engine 18, later more fully described, when the latter is operating with its longer period of admission hereinafter more fully explained. The downstream side of valve device 76 is connected with a conduit 77 which leads to a condenser coil or element 78 in the lower end of the column 73. The central course (as shown) 23a of exchanger 23 is connected at its top with a conduit 79 leading to the oxygen course 62 of the evaporator-condenser 60. Its bottom is connected with the bottom of central course 24a of exchanger 24 by conduit 80. A conduit 81 leads from the top of the central course 24a, and this conduit is connected with the discharge of a liquid oxygen pump 95 later described. The condenser unit 78 is connected at its lower end as shown by a conduit 82 with the intermediate course 24b of exchanger 24. The top of course 24b is connected with a conduit 83 of which more will shortly be said. The course 23c of exchanger 23 is connected at its top with an expanded air conduit 85; and its lower end is connected with the conduit 77 by a conduit 86, containing a check valve 87 openable toward the conduit 77 and connected with the latter by a connection 88. The check valve opens toward the conduit 77, but only when the pressure in the conduit 86 is sufficient to effect opening of the check valve 87 against the pressure in the conduit 77.

The expansion engine 18, which may be of the construction shown in the Samuel C. Collins Patent No. 2,607,322, granted August 19, 1952, provided with suitable means for predeterminedly lengthening and shortening the period of admission, or which may be of the character of the expansion engine employing cam follower rollers one or both of which coact with a cam depending on whether early or late cut-off is desired, which expansion engine is illustrated and described in the patent to Win W. Paget No. 2,678,028, granted May 11, 1954, or which may be of other suitable construction, includes a cylinder 90 having admission and exhaust valves, not shown, and to the admission valve of which air under pressure is admitted from the conduit 67 through a conduit 91 with which an "In" surge tank 92 is connected so as to minimize fluctuation in flow. A discharge or exhaust connection 93 leads from the expansion engine to a "Discharge" surge tank 94, which may have associated with it a strainer to catch any snow that might otherwise attain to the column while the heat exchangers 21 and 22 were not fully cooled down, during the starting up of the apparatus. The expansion engine, as shown, supports on the top of its cylinder the jacketed liquid oxygen pump 95 of any suitable construction, the liquid oxygen pump being, for example, actuated by the expansion engine piston as shown in the last above mentioned Win W. Paget patent, or in any other suitable manner; and it may be noted that the conduit 81 is connected with the discharge of the liquid oxygen pump 95, while the pump has a suction connection 96 leading to it from a strainer 97 which is cooled or jacketed by liquid air, the jacket herein being represented by coil 98. To the strainer 97 a conduit 100 leads from the evaporator-condenser chamber at the bottom of the column 73, the conduit 100 communicating with the condenser unit enclosing chamber 101 in the bottom of the column by a suitable adjustable intake connection device 102, which is connected at its top and bottom, as by conduits 103 and 104, with the chamber 101 respectively above and below the oxygen level in the latter.

The discharge surge chamber 94 has connected with it a conduit 105, which is connected to valve structure 106, which valve structure includes a passage or chamber 107 continuously in communication with the conduit 85, and another chamber connected through a conduit 109 directly with the interior of the column at a point spaced an appropriate distance from the top of the latter.

The valve structure 106, which may be called the by-pass valve, is adapted to have the two chambers mentioned, connected in communication with each other, and thus to connect the "Discharge" surge chamber 94 in free communication with the upper part of the column via the conduit 105, valve structure 106 and conduit 109. In the drawing the constant communication between the conduits 105 and 85 is indicated by the passage or chamber 107, and the communicability of the passage or chamber 107 with the conduit 109 is indicated by the valve 108. Other constructions suited to the functions mentioned may evidently be used. Any suitable operating means for the valve 108 may be provided, as diagrammatically indicated at 108', which is a diaphragm type operating device and may have any suitable control means.

Expansion engine 18 is provided, as has been pointed out above, with a valve gear adapted to permit the engine to operate with admission for a relatively shorter percent of its working stroke, or with admission for a materially longer percent of its working stroke. As will later be explained more in detail, when cut-off is relatively later in the working stroke, the valve structure 106 will prevent communication between the "Discharge" surge chamber 94 and the column through the conduit 109; and when communication between "Discharge" surge chamber 94 and the column is effected by the appropriate adjustment of the valve structure 106, the expansion engine 18 will be operating with admission for a smaller fraction of its working stroke.

During the production of low pressure oxygen approximately ten percent of the entering air will flow through evaporator-condenser 60, and approximately ninety percent will pass through the expansion engine, and these two streams of air will be united in the conduit 77 and enter the evaporator-condenser 78 in the bottom of the column 73. During the cooling-down period, and during high pressure oxygen production, when the expansion engine 18 is operating with short cut-off, a much larger quantity of air will, however, pass through the conduit 75, following passage through the evaporator-condenser 60. Always, only such air will pass through the conduit 75 as is at a sufficient pressure to open the pressure reducing valve 76. Any air passing through evaporator-condenser 60 unliquefied will, of course, be liquefied in evaporator-condenser 78.

The conduit 83, previously mentioned, leads to a valve device 110, which is adapted to be adjusted to effect a reduction of on the order of 63 p. s. i. in the pressure of the fluid (liquid air) which flows through it. The downstream side of the valve device 110 is connected by a conduit 111 with the jacket 98 for the strainer 97, and the top of this jacket is connected by the conduit 112 with the jacket 113 of the liquid oxygen pump 95, there being a conduit 114 leading from the jacket 113 to a connection 115 through which liquid air may be admitted to the top of the column 73.

The column 73 may be of any suitable construction and is illustrated as of the conventional packed type, and may obviously assume various forms. The Samuel C. Collins Patent No. 2,610,046, granted September 9, 1952, shows a column which is well adapted for the purpose for which the present column is employed.

The column may normally be operated with a pressure on the order of 7 p. s. i. and in order to evaporate liquid oxygen with the latent heat of condensation of air under pressure in the condenser 78, the pressure of the air in said condenser should be on the order of 70 p. s. i., and accordingly the valve 110 will be set to maintain a differential in pressure, neglecting friction losses in conduits and courses, of about 63 p. s. i. between its upstream and downstream sides. The expansion engine, when working with later cut-off has an expansion through it equal to the difference between the pressure at which air is supplied and the pressure in line 77. Thus the expansion engine provides a pressure drop on the order of 90 p. s. i. It is to be noted that the conduit 75 and the valve device 76 are substantially in parallel with the expansion engine and the check valve 87, and accordingly the valve device 76 is set to give a pressure reduction on the order of 90 p. s. i. so that the air starting say at 160 p. s. i. in the air course 63 of the evaporator-condenser 60 and passing through conduit 74, heat exchanger course 23b, conduit 75 and passing valve device 76 may attain to the conduit 77 at substantially the pressure at which the air is delivered through the conduit 88.

The apparatus illustrated and described may be employed for the production of liquid oxygen at high pressure for cylinder charging, but its primary purpose is to furnish oxygen at a pressure on the order of 55 pounds per square inch to a shop line. The operation during the production of oxygen for cylinder charging is the same to all practical extents and purposes as in the Collins application first above mentioned, and so will not be described here at all. The operation during production of oxygen for supply to a shop line is, except with respect to the procedures adopted for the purpose of insuring the complete removal of water vapor and carbon dioxide from the entering air, and for the maintenance of the reversing heat exchanger system in long continued, effective operation, essentially the same as in said Collins application first above mentioned, and so an effort at brevity will be made. A little more air will be passed unliquefied through the conduit 74, course 23b of heat exchanger 23, conduit 75 and pressure reducing valve 76, and into the boiler condenser coil 78 than in the process described in said Collins application, but otherwise the process of the production of liquid air and the rectification of the liquefied air will be essentially the same as in the process of said earlier application.

The water vapor and carbon dioxide will be caused to be separated out of the entering air stream by cold applied by the leaving streams of oxygen product and nitrogen. The carbon dioxide will be largely deposited in heat exchanger 22 upon the walls of the courses 22b and 22c, and the water vapor as liquid water and as ice in the courses 21b and 21c of exchanger 21.

The liquid oxygen drawn from the chamber 101 in the column 73, through conduit 100 to strainer 97 and conduit 96 is pumped by the liquid oxygen pump 95 through the conduit 81, through the course 24a in heat exchanger 24, through the conduit 80, through course 23a of heat exchanger 23, through conduit 79, through oxygen course 62 of evaporator-condenser 60, through conduit 65, through course 22a of heat exchanger 22, through conduit 33, and through course 21a of heat exchanger 21, and is finally delivered to the line 25. It will be noted that the three-way valve V will occupy the position shown in Fig. 1 at this time.

The nitrogen leaving the column by way of the connection 72, and passing through the conduit 71, through course 24c of heat exchanger 24, through conduit 68, through course 23d of heat exchanger 23, through conduit 53, through one or the other of courses 22b or 22c of heat exchanger 22, through one or the other of the conduits 32 or 31, through one or the other of the courses 21b or 21c of heat exchanger 21, through one or the other of the conduits 15 or 16, will be released through the escape conduit 13, having passed through appropriate passage means in the valve mechanism 12.

The leaving oxygen stream passing through the courses 22a and 21a will contribute to the effective functioning of the heat exchangers 22 and 21 by aiding in the freezing out of the water vapor and the effecting of the deposit of carbon dioxide snow, and as will shortly be described. The leaving nitrogen effluent will contribute to this separative action and will also, provided proper conditions be maintained, effect complete removal from the courses of the exchangers through which it passes, of the deposits of ice and carbon dioxide snow. It is necessary that the carbon dioxide snow be deposited far enough from the point of entrance to the courses 22b and 22c of the leaving nitrogen effluent for the latter to have attained the necessary conditions to enable it to sublime the carbon dioxide when it comes in contact with it. The procedure disclosed in connection with this embodiment of the invention, and the procedure with similar apparatus disclosed in the second embodiment, are adapted to and will cause the leaving oxygen to possess sufficient heat absorptive capacity as it traverses courses 22c or 22b to effect the depositing out of the carbon dioxide at places where the nitrogen effluent can completely remove it.

The following are the arrangements made in connection with the apparatus of Fig. 1 to enable the leaving nitrogen effluent to effect complete removal of the deposits of carbon dioxide in the passages traversed essentially by entering air and leaving nitrogen effluent in the heat exchanger section 22. The total mass per unit of time of the nitrogen flowing out is of course less than the total mass per unit of time of the entering air. This means that a relatively small temperaure difference is required to be maintained between the entering air stream and the outwardly flowing nitrogen in the regions of the passageways 22b and 22c from which solidified carbon dioxide is to be removed. This can be accomplished by effecting evaporation (vaporization) of a portion of the leaving oxygen stream in course 22a. Accordingly, instead of effecting complete vaporization of the liquid oxygen in the evaporator-condenser 60 arrangements are made to effect a partial evaporation only therein—with the result that there will be an efficient use of the refrigeration available in the liquid oxygen, but at the same time vaporization of all of the liquid oxygen in evaporator-condenser 60 will be prevented so that some of the liquid oxygen will pass over into course 22a, and, through the absorption from the entering air stream of heat in quantities sufficient to complete the evaporation of the still liquid portion of the leaving oxygen stream in exchanger 22, there will be effected such a reduction in the temperature differential, at any point in the exchanger 22 where carbon dioxide may be deposited, between the leaving nitrogen stream and the surfaces, whether of the conduit or of the carbon dioxide deposits, over which such stream passes, that all of the deposits may be sublimed and carried out of the exchanger and all danger of gradual obstruction and ultimate plugging of the exchanger is removed.

For the purpose of accomplishing this desirable function the following arrangements are made. When once the physical structure of a heat exchanger has been fixed, then the rate of heat transfer which may be effected between the streams passing through the heat exchanger per degree of temperature difference per unit of time is a fixed one. By the establishment of the pressure of the entering air stream at 160 p. s. i. one temperature is fixed. By the proper predetermination of the pressure of the leaving oxygen, the other temperature will be fixed. By establishing the pressure of the leaving oxygen stream at on the order of 55 p. s. i. there will be effected such a temperature difference that with the physical structure provided there will not be within evaporator-condenser 60 complete evaporation or vaporization of the liquid oxygen. Accordingly, a portion of the oxygen still in liquid state will be delivered to the course 22a of exchanger 22, and the vaporization of this residual quantity of liquid oxygen in exchanger 22 will bring about a lowering of the temperature in this exchanger progressively from the end of the latter from which the entering air stream leaves toward the other end such as to permit the leaving nitrogen stream, whose ability to sublime the carbon dioxide deposits increases towards the upper end of this exchanger to effect a complete sublimation and carrying out of the carbon dioxide deposits.

In view of the similarity of the present invention to the subject-matter of the Collins application first above identified, it does not appear necessary to describe the temperatures and pressures and status throughout the whole generator. It will simply be noted that 10 percent of the entering air stream at a temperature of say 112° K. and a pressure of 160 p. s. i. enters the top of evaporator-condenser 60 and is brought therein into heat exchange relation with a leaving oxygen stream—all liquid when it enters the course 62.

It will be remembered that all of the air passing through the evaporator-condenser during 50 p. s. i. oxygen production would be liquefied by the removal of the quantity of heat which would be furnished by the vaporization of this full quantity of liquid oxygen if the latter were at a temperature of 107° K. and at a pressure of p. s. i. If, however, the pressure of the leaving oxygen stream is increased, then less than the whole quantity thereof can be vaporized by the entering air fraction which passes through evaporator-condenser 60, and a portion of the oxygen in liquid form will be caused to pass over through passage 65 into the course 22a. For example, by placing a back pressure in excess of 50 p. s. i. on the leaving oxygen stream, the quantity of still liquid oxygen passing into passage 65 may readily be fixed at the desired value. For example, if the back pressure be raised to 55 p. s. i. a substantial portion of the leaving oxygen stream will pass into course 22a still in liquid form, and the heat of vaporization of this still liquid oxygen will cause the depositing out of the carbon dioxide in the courses 22b and 22c in such portions in the latter as to permit the leaving nitrogen streams to sublime and remove the deposits completely. Under such conditions the temperature of the air in conduit 52 may be 114° K., and the temperature of the oxygen leaving the course 62 will be 108° K.

To enable the maintenance of the desired back pressure on the leaving oxygen stream during low pressure oxygen production resort may be had to a manually adjustable restrictor valve, but I prefer to employ an automatic valve means, and I have shown diagrammatically in Fig. 1, a balanced valve 121 in the line 25 and this is connected by tubing 122 with an oxygen filled bulb 123 arranged in good heat exchange relation with the conduit 52. It will be understood that the building up of pressure in the bulb 123 will progressively close the valve 121, and closing movement of the valve 121 by its fluid pressure responsive operating means will increase the back pressure on the leaving oxygen stream. As a temperature increase of the air in conduit 52 will mean that conditions in heat exchanger 22 are unsuited for the effective removal of the carbon dioxide, and as such a temperature increase will cause the back pressure in the leaving oxygen to increase, with a resultant increase in the percentage of still liquid oxygen entering heat exchanger 22, and with a resultant increase in heat absorptive capacity of the oxygen in exchanger 22, it will be evident that the conditions necessary for assurance that plugging by carbon dioxide snow shall not occur in the reversing courses of exchanger 22 will be automatically maintained.

As has been earlier indicated, the leaving liquid oxygen stream, if it be brought into heat transfer relation with a proper amount of entering air from the reversing heat exchangers, and if there be a proper temperature differential between the two streams, can be completely vaporized, with a use of all of its heat of vaporization in liquefying directly a portion of the air undergoing the separating process. However, a portion of the heat of vaporization of the leaving oxygen product may desirably be used in the reversing heat exchanger for the purpose of insuring the maintained effective operation of the latter. A method of accomplishing this has been described in accordance with which an increased back pressure on the leaving oxygen product prevents complete vaporization thereof in an evaporator-condenser so designed that, save for such increased back pressure, a certain quantity of entering air would be completely liquefied in the evaporator-condenser by the total heat of vaporization of the leaving oxygen stream and such stream would be wholly in a gaseous state upon leaving the evaporator-condenser, the quantity of air passing to the evaporator-condenser being predetermined by the amount of the total entering air which is passed through an expansion engine. In other words, the predetermined design of the expansion engine with relation to the rest of the system would be such that there would be directed to the evaporator-condenser substantially that quantity per unit of time—or a very slight excess thereover—which can be completely liquefied by the heat of vaporization of the leaving oxygen.

According to another practice of the invention (see Fig. 2), the expansion engine 18' will be so designed with respect to the rest of the system—and the evaporator-condenser 60' may be so redesigned that, notwithstanding the rate of liquid oxygen production might be able to liquefy say 10 or 12 percent of the entering air, the quantity of air admitted to the evaporator-condenser 60' would be so diminished by reason of the increased capacity of the expansion engine, that a desired percentage of the oxygen would not be vaporized in the evaporator-condenser and would pass over in liquid form to the heat exchanger 22. Evidently the evaporator-condenser 60' could be slightly reduced in size, and the size of the expansion engine—or perhaps, in view of the small additional quantity it would need to handle, a change in cut-off might suffice—would simply be increased so that say 5 or 6 percent of the entering air stream would pass through the evaporator-condenser 60' and be completely liquefied therein without any need for any increase above the 50 p. s. i. delivery pressure of the apparatus of my application first above identified, and a portion of the liquid oxygen portion at 50 p. s. i. would pass into the heat exchanger 22 and enable the latter to perform its function effectively for long periods.

While there are in this application specifically disclosed two embodiments of the invention from its apparatus aspect and two processes by which the invention may be practiced from its method aspect, it will be understood that these are presented for purposes of illustration and that the invention may be modified and embodied and practiced in various other forms and processes without departing from its spirit or the scope of the appended claims.

What I claim as new and desire to secure by Letters Patent is:

1. In a method of producing substantially pure gaseous oxygen from compressed air which includes the moving, through a heat exchanger and an evaporator-condenser, to a column, of a stream of air in heat exchange relation with a stream of liquid oxygen from the column at higher than column pressure, the improvement which consists in maintaining the relative pressures of the air and oxygen and their mass rates of flow so that there shall occur a partial vaporization of the leaving oxygen in the evaporator-condenser and a completion of the vaporization thereof in the heat exchanger, and complete liquefaction of the air in the evaporator-condenser by the absorption of the heat of condensation thereof by the partial vaporization of the oxygen.

2. In a method of producing substantially pure gaseous oxygen from compressed air which includes the moving, through a heat exchanger and an evaporator-condenser, to a column, of a quantity of air in heat exchange relation with oxygen from the column at higher than column pressure, the improvement which consists in maintaining the relative masses and pressures of the oppositely moving air and oxygen streams in the evaporator-condenser such that there shall be a complete liquefaction of the air attended by only a partial vaporization of the oxygen in the evaporator-condenser.

3. Method of producing substantially pure gaseous oxygen from compressed air which includes moving successively through a heat exchanger, an evaporator-condenser, another heat exchanger and a valve device into a column a quantity of air while causing liquid oxygen at a pressure above column pressure to go through said another heat exchanger and said evaporator-condenser in counterflow relation to the entering air and to pass while still in part in liquid form over into said first mentioned heat exchanger, the pressure of the entering air and the pressure of the liquid oxygen and the mass rates of flow thereof being such that there may be complete condensation of air in said evaporator-condenser and attendant vaporization of a substantial portion of the oxygen, but not all thereof, in said evaporator-condenser.

4. Method of producing oxygen at super-column pressure, which includes passing air through at least one heat exchanger, dividing the air, passing a portion of the air through an expansion engine, liquefying the air exhausted from the expansion engine and passing it through a column, passing another portion of said air through an evaporator-condenser in heat exchange relation therein with oxygen product only, passing said second portion through the column, withdrawing liquid oxygen from the column and imposing on it a pressure in excess of the pressure in the column, and passing the liquid oxygen through said evaporator-condenser and said heat exchanger, and maintaining the pressures of the air and oxygen as they pass through said evaporator-condenser, and the proportion of the air passing through said evaporator-condenser, such that there is effected at least partial liquefaction of the air in said evaporator-condenser and less than total vaporization of the oxygen in said evaporator-condenser, whereby a portion of the oxygen passes in a liquid state into the at least one heat exchanger for vaporization therein.

5. The method of producing, by the separation of compressed air by cooling and rectification, oxygen at pressures above column pressure, with a high degree of purity and conservation of refrigeration, including passing the compressed air through at least one heat exchanger, dividing the air, passing a portion thereof through an expansion engine, liquefying said portion, further reducing the pressure of said portion and introducing it into a column for rectification, passing another portion of said air through an evaporator-condenser in heat exchange relation with oxygen product only and liquefying it therein, reducing the pressure of the air liquefied in said evaporator-condenser to the pressure at which said first mentioned portion was introduced into the column, and introducing said second mentioned portion into said column, withdrawing liquid oxygen from the column and pumping it through the evaporator-condenser in heat exchange relation with the air passing through the latter and utilizing in said evaporator-condenser the latent heat of condensation of the compressed air to evaporate a portion only of the liquid oxygen, and passing the mixture of liquid and gaseous oxygen into said at least one heat exchanger for flow therein in counterflow relation to the entering air.

6. The method of producing, by the separation of compressed air, by cooling and rectification, oxygen at pressures above column pressure, with a high degree of purity and conservation of refrigeration, including passing compressed air through at least one heat exchanger, dividing the air, passing a portion thereof through an expansion engine and through a column, passing another portion thereof through an evaporator-condenser in counterflow heat exchange relation with oxygen only and through the column, withdrawing liquid oxygen from the column and pumping it at a pressure higher than the pressure within the column and above that at which complete vaporization thereof by the counterflowing air in the evaporator-condenser is possible, through the evaporator-condenser in heat exchange relation with the air portion passing through the latter, and utilizing in the evaporator-condenser heat of condensation of the air to vaporize a portion of the oxygen passing through the evaporator-condenser at such pressure and utilizing in said at least one heat exchanger the remaining heat of vaporization of the oxygen to augment cooling.

7. The method of producing by the separation of compressed air by cooling and rectification, oxygen at pressure above rectification pressure, with maximum conservation of refrigeration, including passing the compressed air through at least one heat exchanger, dividing the air, passing a portion thereof through an expansion engine, passing another portion thereof through an evaporator-condenser in heat exchange relation with oxygen only, uniting and liquefying said portions, reducing the pressure of the liquefied air and rectifying it in a column, withdrawing liquid oxygen from the column and pumping it at a pressure above column pressure through the evaporator-condenser in heat exchange relation solely with the air passing through the latter and utilizing in said evaporator-condenser a portion of the refrigerative effect of the evaporating liquid oxygen at its pressure substantially above column pressure to liquefy air passing through said evaporator-condenser and utilizing the remainder of such refrigerative effect in said at least one heat exchanger for the removal of impurities therein.

8. The method of producing oxygen at pressures above atmospheric with maximum conservation of refrigeration including passing compressed air at a pressure on the order of 160 p. s. i. through at least one heat exchanger, dividing the air, passing a portion thereof through an expansion engine, passing another portion thereof through an evaporator-condenser in heat exchange relation with oxygen only, liquefying said portions, reducing the pressure of the liquefied air and rectifying it in a column, withdrawing liquid oxygen from the column and pumping it at a pressure on the order of 55 p. s. i. through the evaporator-condenser and utilizing in the latter the heat of vaporization of the oxygen at said pressure on the order of 55 p. s. i. to liquefy at least a substantial portion of the air passing through said evaporator-condenser, and then passing the saturated oxygen into said at least one heat exchanger in counterflow relation to the entering compressed air.

9. Method of producing oxygen at super-column pressure, including conservation of refrigeration, minimization of power input, and maintenance of stability of operation, which includes dividing an entering stream of air to be processed into two streams, passing one stream thereof through an expansion engine which is normally traversed by the major fraction of the entering air, passing another stream of the entering air, sufficient to supply any call for air by the expansion engine under varying operating conditions, through an evaporator-condenser in heat exchange relation with oxygen only, rectifying both streams, and pumping the oxygen product, at a pressure above column pressure, through the evaporator-condenser in heat exchange relation with the second stream of air, the pressures of said second stream and of said oxygen being such that the saturation temperature of the compressed air exceeds the saturation temperature of the oxygen, but by an insufficient amount to enable a sufficient transfer of heat within the evaporator-condenser to vaporize fully the oxygen in the latter.

10. The method of producing, by separation of compressed air by cooling and rectification, oxygen at pressures above column pressure with conservation of refrigeration and the avoidance of plugging by carbon dioxide snow, including passing compressed air through at least one heat exchanger, dividing the air, passing a portion thereof through an expansion engine and through a column, passing another portion through an evaporator-condenser in heat exchange relation with oxygen only and through a column, withdrawing liquid oxygen from the column and pumping it at a pressure higher than the pressure within said column through the evaporator-condenser in heat exchange relation to the air portion passing through the latter, utilizing in the evaporator-condenser the heat of condensation of the air to vaporize a portion only of the oxygen passing through the evaporator-condenser at a pressure substantially above column pressure and utilizing in the at least one heat exchanger the heat of vaporization of the still liquid oxygen portion to effect the separation out of carbon dioxide at a point remote from the end of said at least one heat exchanger which is nearer along the path of flow to said evaporator-condenser.

11. Method of producing from a mixture of gases one of the constituent gases at a desired pressure, with conservation of refrigeration and minimization of power input, which includes the separation of said constituent in a column, the imposition of a pressure upon said constituent in liquid form to bring it to a pressure exceeding the pressure under which it is withdrawn from the column, the passage of such constituent so increased in pressure to an evaporator-condenser and the causing of such a portion of the mixture being processed to produce such constituent to pass through said evaporator-condenser in heat exchange relation with such constituent and at such pressure as itself to be wholly liquefied and to evaporate by its own heat of condensation a portion, but less than the whole of said constituent, and the passing of said constituent partially in liquid and partially in gaseous form in heat exchange relation with the mixture to be separated.

12. The method of separating the constituents of a gaseous mixture to obtain as an end product one of its constituents in substantially pure form by effecting the removal of impurities from an entering compressed gaseous mixture by the subjection of the same to low temperatures, expanding one portion of the purified mixture with the production of external work, subjecting another portion of the purified mixture to heat exchange with the end product only, subjecting both of said portions to heat exchange with the end product and the effluent while said portions remain separated from each other, reducing the pressure of said another portion to the pressure of the first portion, combining said portions and bringing the mixture to a completely liquefied state through heat interchange with a body of liquefied gas, subjecting the liquefied mixture to heat exchange with the end product and the effluent, reducing the pressure of the liquefied mixture and subjecting the mixture to rectification to form said body of liquefied gas, which method includes withdrawing the end product in liquid form from the rectifier, increasing its pressure to the pressure desired for use, and maintaining the portion of the compressed gaseous mixture which is to be subjected to heat exchange with said end product such that the latent heat of condensation thereof is enough less than equal to the latent heat of evaporation of said end product at said pressure of use that a portion of the latent heat of evaporation of said end product is available, after heat exchange between said end product and said another portion of the compressed gaseous mixture, for cooling the entering gaseous mixture upon the effecting of a heat exchange relation between said end product and the whole entering stream of gaseous mixture.

13. The method of separating the constituents of a gaseous mixture to obtain as an end product one of its constituents in substantially pure form by effecting removal of impurities from an undivided entering stream of a compressed gaseous mixture by the chilling of the latter, expanding one portion of the purified compressed gaseous mixture with the production of external work, subjecting another portion of the compressed gaseous mixture to heat exchange with the end product only, subjecting both of said portions to heat exchange with the end product and the effluent while said portions remain separated from each other, reducing the pressure of said another portion to the pressure of the first portion, combining said portions and bringing the mixture to a completely liquefied state through heat interchange with a body of liquefied gas, subjecting the liquefied mixture to heat exchange with the end product and the effluent, reducing the pressure of the liquefied mixture and subjecting the mixture to rectification to form said body of liquefied gas, which method includes withdrawing the end product in liquid form from the rectifier, increasing its pressure to the pressure desired for use, and causing the expansion engine to take such a portion of the gaseous mixture that the portion of the compressed gaseous mixture which is subjected to heat exchange with said end product has the cumulative latent heat of condensation thereof at least less than equal to the latent heat of evaporation of said end product at said pressure of use, whereby a portion of such heat of evaporation is made available for chilling the undivided gaseous mixture.

14. In apparatus for producing and delivering oxygen gas under pressure substantially in excess of that under which the oxygen is separated, the combination of an expansion engine by which compressed gas of which oxygen and nitrogen are constituents is cooled by expansion with the performance of work, an evaporator-condenser in which such compressed gas is liquefied by travelling in proximity to outgoing oxygen only, a rectification column in which such gas not previously liquefied is liquefied and the oxygen and nitrogen are separated, a connection with the column from which liquid oxygen may be drawn, and a liquid oxygen pump having its suction connected with said connection and its discharge leading to said evaporator-condenser whereby liquid oxygen is supplied to the latter, and means including a restrictor for the oxygen gas discharge line for automatically maintaining the pressure of the oxygen in said evaporator-condenser at such a height that only partial vaporization of the oxygen takes place therein.

15. In apparatus for producing and delivering oxygen gas under pressures substantially in excess of those under which the oxygen is separated, the combination of an expansion engine by which compressed gas of which oxygen and nitrogen are constituents is cooled by expansion with the performance of work, an evaporator-condenser in such compressed gas is liquefied by heat exchange with outgoing oxygen only, a rectification column in which such gas not previously liquefied in said apparatus is liquefied and the oxygen and nitrogen are separated, a connection with the column from which liquid oxygen may be drawn, and a liquid oxygen pump having its suction connected with said connection and its discharge leading to said evaporator-condenser whereby liquid oxygen is supplied to the latter, the capacity of said expansion engine being so related to the total compressed gas supply that the mass of the compressed gas passing through said evaporator-condenser can only partially evaporate the outgoing oxygen product while being itself at least substantially liquefied by the refrigeration produced by vaporization of said oxygen.

16. In a method of separating air into components, wherein a compressed air stream is passed in one direction of flow through a reversing heat exchange zone along a cooled path therein progressively decreasing in temperature from end to end to effect cooling of the stream and resultant precipitation of carbon dioxide in a colder portion of said path and wherein a second gaseous stream obtained from the air after said precipitation is passed subsequently at a lower temperature than said colder portion through the same path in the opposite direction of flow after the first stream has ceased flow therethrough; the step of controlling the temperature of the colder portion of said path by passing oxygen through a separate path in said heat exchange zone disposed in heat exchange relation with at least a part of said colder portion of said first mentioned path, introducing said oxygen into said separate path at a pressure substantially exceeding the pressure of said second gaseous stream and in a partially liquid, partially gaseous state, the portion of oxygen in the liquid state when said oxygen is introduced into said separate path being sufficient for said oxygen to effect a reduction in the temperature differential, at any point in said reversing heat exchange zone where carbon dioxide may be deposited, between the second stream and the surfaces over which it passes, to enable said second stream to remove fully the carbon dioxide deposits over which it flows, but insufficient to cause oxygen to leave its separate path before at least substantially complete vaporization thereof.

17. In a method of separating air into components, wherein a compressed air stream is passed in one direction of flow through a reversing heat exchange zone along a cooled path therein progressively decreasing in temperature from end to end to effect cooling of the stream and resultant precipitation of carbon dioxide in a colder portion of said path and wherein a second gaseous stream obtained from the air after said precipitation is passed subsequently at a lower temperature than said colder portion through the same path in the opposite direction of flow after the first stream has ceased flow therethrough; the step of controlling the temperature of the colder portion of said path by passing oxygen through a separate path in said heat exchange zone disposed in heat exchange relation with at least a part of said colder portion of said first mentioned path, introducing said oxygen into said separate path in a partially liquid, partly gaseous state, the portion of oxygen in the liquid state when said oxygen is introduced into said separate path being sufficient for said oxygen to effect a reduction in the temperature differential, at any point in said reversing heat exchange zone where carbon dioxide may be deposited, between the second stream and the surfaces over which it passes, to enable said second stream to remove fully the carbon dioxide deposits over which it flows, but insufficient to cause oxygen to leave its separate path before at least substantially complete vaporization thereof.

References Cited in the file of this patent

UNITED STATES PATENTS

| Number | Name | Date |
| --- | --- | --- |
| 1,394,955 | Recklinghausen | Oct. 25, 1921 |
| 1,976,388 | Eichelman | Oct. 9, 1924 |
| 2,180,715 | Messer | Nov. 21, 1939 |
| 2,460,859 | Trumpler | Feb. 8, 1949 |
| 2,464,891 | Rice | Mar. 22, 1949 |
| 2,480,094 | Anderson | Aug. 23, 1949 |
| 2,503,939 | De Baufre | Apr. 11, 1950 |
| 2,568,223 | De Baufre | Sept. 18, 1951 |
| 2,640,332 | Keyes | June 2, 1953 |

FOREIGN PATENTS

| Number | Country | Date |
| --- | --- | --- |
| 469,939 | Great Britain | Aug. 3, 1937 |